Patented Oct. 30, 1951

2,572,923

UNITED STATES PATENT OFFICE 2,572,923

UNIFORMLY SUBSTITUTED GLUCOPYRA-NOSE POLYMERS AND PROCESS FOR THEIR PREPARATION

Kenneth M. Gaver and Esther P. Lasure, Columbus, Ohio, and Derk V. Tieszen, Delmar, N. Y., assignors to Ohio State University Research Foundation, Columbus, Ohio, a corporation of Ohio Application October 23, 1947, Serial No. 781,708

28 Claims. (Cl. 260—209)

The inventions disclosed in this application relate to new compositions of matter or compounds and to new processes for the formation of such compounds. The processes described herein illustrating our invention are designed to produce new products from carbohydrates and similar compounds. Any compound having a hydroxyl or an analogous group (nitrogen or other nonmetal analogue) in a position adjacent to a double bond or a potential double bond can be considered a carbohydrate or similar compound and when manipulated according to our processes reacts similarly. The processes when applied to carbohydrates ordinarily include the synthesis of a polyalkali carbohydrate and include as one of the steps in the production of such polyalkali carbohydrate, reaction of the carbohydrate with an alkali hydroxide or similar alkaline material.

Our new processes are applicable to all types of carbohydrates such as the monosaccharides, disaccharides, trisaccharides and tetrasaccharides and polyamyloses which are some times designated as sugars; polysaccharides including dextrins, starches, cellulose, lichenin, dextran, glycogen, inulin, etc.; conjugated saccharides including gums, glucosides and tannins; and derived saccharides. As stated above, it is also applicable to other compounds similar to carbohydrates provided such compounds have a hydroxyl group attached to a carbon which is adjacent to a carbonyl group or a potentially carbonyl group.

While, as stated above, the invention is not limited to starches it may very easily be illustrated as applied thereto. Thus in carrying out certain embodiments of our process, we produce from starch certain new compounds which we have discovered and synthesized by our processes and which are in the nature of alcoholates or ethers of starch. To designate these compounds, we have coined the word "starchate" which we define as follows: "Starchate" means and is used in this specification and in the claims hereof in the sense of a compound composed of an undetermined number of polymerized glucopyranose units wherein a metallic atom or other inorganic group or organic radical has been substituted for each of the hydrogen atoms of one or more of the several hydroxyl groups of the starch unit so as to form a polymerized compound which in fact is (or is at least analogous to) an alcoholate of starch, wherein one or more of the hydroxyl hydrogens of the starch unit have been replaced.

By the substitution, as suggested above, of alkali metal atoms for two or more hydroxyl hydrogen atoms of the carbohydrate molecule (or of each unit thereof as in the case of the glucopyranose units of the starch molecule) we produce polyalkali carbohydrates. We may then treat the polyalkali carbohydrates so formed to produce derivatives thereof. For example, we may mention now some of the applications of the new processes as applied to starch. If the carbohydrate is a starch, the resulting product will be a polyalkali starchate and the polyalkali starchate may be treated to produce derivatives thereof. The derivatives produced in such cases may be either polymetallic (alkali or nonalkali) starchates, poly-inorganic non-metal starchates or poly-ether starchates. In all such cases the product will be a polysubstituted starchate having an undetermined number of glucopyranose units each having a structural formula corresponding to one of the following:

or where G represents a group selected from the class of monovalent alkali metals, monovalent non-alkali metals, monovalent metallic groups, monovalent inorganic nonmetal elements and groups and monovalent organic substituents. A generalized formula to embrace both of the above formulas would be the following:

where G represents a group selected from the class of monovalent alkali metals, monovalent metallic groups, monovalent nonalkali metals, monovalent inorganic nonmetal elements and groups and monovalent organic substituents and G' represents either such a group or a hydrogen atom.

Prior to our inventions discolsed herein, a certain process had been discovered for the substitution of alkaline metals in the starch molecule to form a starchate which process and product will be referred to hereinafter as the "ammonia process" and as the "ammonia process starchate." As demonstrated in copending applications Serial No. 694,328 and Serial No. 707,318, now Patent No. 2,518,135, and as demonstrated hereafter in this application, such prior art processes produce starchates which differ essentially from almost all of polysubstituted starchates disclosed and described in this application. Also, it was demonstrated in copending applications Serial No. 694,328 and Serial No. 707,318, and it will be demonstrated hereafter here in that such "ammonia process starchates" differ from the monosodium starchate and other monoalkali starchates and derivatives thereof which were disclosed in such prior applications.

Referring further to the prior art process designated above as the "ammonia process," it may be noted that Schmid et al. (Chemical Abstracts 20:744 (1926) and Chem. Zentr. 2:1761, 1928) produced a monoalkali derivative of starch by treating the starch in liquid ammonia with an alkali metal. Either as a final product or as an intermediate product these investigators obtained a monoalkali compound in which the investigators concluded (their conclusions being probably correct) that the reaction occurred on the six position carbon in the gluco-pyranose unit of the starch molecule.

Likewise, if glycogen, inulin, lichenin, etc. are treated in liquid ammonia with an alkali metal, a monoalkali derivative is formed which is similar to the ammonia process starchates referred to above. This monoalkali "ammonia process" derivative differs essentially from the monoalkali derivative formed in the process described in applications Serial No. 694,328 and Serial No. 707,318 and herein in that the alkali metal in such "ammonia process" derivatives is attached to the number six carbon atom of the glucopyranose unit whereas the monoalkali derivatives, described in such prior applications and described herein in connection with the processes of our invention, is one in which the alkali metal is always attached to the number two carbon atom which is adjacent to the carbonyl group.

Other investigators obtained sodium hydroxide adsorption compounds by dissolving starch in aqueous alkali followed by alcoholic precipitation or by treating starch with alkali metal alcoholates. These compounds, however, were not starchates in that the alkali metal did not enter into the starch molecule.

With our process we can form selectively disubstituted and trisubstituted starches, glycogen, inulin, cellulose, lichenin, gums, etc. having substantially any desired substituents. Many if not all of these selective products are impossible under the prior art processes.

Also, according to prior art methods, polysubstituted products of cellulose and of simple sugars have been prepared, as, for example, as described in Scherer and Hussey, Journal of American Chemical Society, 53:2344 1931; Schorigin, Berichte 69:1713 (1936); Peterson and Barry, U. S. Patent 2,157,083 (1939); British Patent 463,056 (1937); Muskat, Journal of American Chemical Society, 56:693 (1934); and Muskat, Journal of American Chemical Society, 56:2449 (1934). As will be demonstrated below, these polysubstituted products of cellulose and of sugars are formed by entirely different reactions from those involved in producing the products of our processes.

Heretofore as stated above, it has been possible by known processes to form compounds in which metallic and nonmetallic elements, organic radicals and/or other groups are substituted for the hydrogen atoms of one or more of the hydroxyl groups of glucose and similar sugars and of cellulose. However, it has not been possible heretofore to predetermine accurately which hydroxyl group would be reacted to receive these substituted groups except that where there is sufficient alkali present all hydroxyl groups could be reacted. With our process we can form disubstituted cellulose selectively; we can form disubstituted sugars in which we believe the substituents are selectively positioned; and we can form other polysubstituted sugars, cellulose, etc., by a new process.

One of the objects of our invention is the provision of new and useful processes of forming new and useful carbohydrates and similar compounds.

A further object of our invention is the provision of new and useful products formed from carbohydrates and similar compounds.

A further more specific object of our invention is the provision of new and useful processes for forming various new products from starch.

A further object of our invention is the provision of new and useful processes for forming various new alcoholates of starch and other carbohydrates.

A further object of our invention is the provision of new and useful processes of forming polysubstituted products from starch and other carbohydrates.

Further objects of our invention are the provision of polymetallic derivatives of polyalkali metal alcoholates of starch and other carbohydrates and the provision of the processes of forming them.

Further objects of our invention are the provision of organic derivatives of polyalkali metal alcoholates of starch and other carbohydrates and the provision of processes of forming them.

Further objects and advantages of the present invention will be apparent from the following description, reference being had to the accompanying drawings wherein preferred forms of embodiments of the invention are clearly shown.

In copending application Serial No. 707,318, there are disclosed inventions relating to monoalkali metal starchates, methods for their preparation, and derivatives thereof. The inventions so disclosed are based upon the discovery that when starch is reacted with alcohol soluble hydroxides (such as the hydroxides of lithium, sodium, potassium, rubidium and caesium) under certain conditions there is produced a metallic starchate wherein the alkali metal is attached through an oxygen atom to a carbon atom in the complex glucopyranose residue (the structure commonly considered as the building unit of starch).

The starchate product formed is a polymerized glucopyranose compound. The structural formula of the unit which is polymerized to form the complex starchate may be illustrated as follows wherein M^a represents an alkali metal:

This product we will designate hereinafter in this application as a 2-monoalkali starchate.

It has been known commonly heretofore that starch may be modified by treatment with aqueous solutions of alkalies, alkaline salts, alkaline earth hydroxides and other hydroxides to produce starch products wherein a certain amount of the alkali, alkaline salts, alkaline earth hydroxide or other hydroxides is adsorbed on the starch building units. Various coordinated compounds has been reported as having compositions represented by the following formulae:

(1) $C_{12}H_{20}O_{10}.NaOH$
(2) $2C_{12}H_{20}O_{10}.NaOH$
(3) $3C_{12}H_{20}O_{10}.NaOH$
(4) $C_{12}H_{20}O_{10}.Ba(OH)_2$
(5) $2C_{12}H_{20}O_{10}.Ba(OH)_2$
(6) $3C_{12}H_{20}O_{10}.Ba(OH)_2$

It must be noted that none of the investigators reporting such coordinated complexes obtained $C_6H_{10}O_5.NaOH$. As will be later described, $C_6H_{10}O_5.NaOH$ is apparently one of our intermediate products. None accomplished the reaction in a nonaqueous medium or even removed all water from the product and none heated the product to cause our condensation reaction.

Similar compounds of beryllium, calcium, strontium, magnesium, zinc, aluminum, copper, iron and lead either alone or in combination with other metals have been reported. The inability of the various investigators to make these compounds undergo the Williamson ether reaction is proof of their coordinated nature. As will be pointed out, our 2-monoalkali metal starchates readily undergo the Williamson ether reaction. Obviously, the product formed in all of the above mentioned prior art processes were not compounds in the strictest sense but rather coordinated complexes of poorly defined nature.

2-MONOALKALI STARCHATES

The disclosure of the inventions claimed and described in said copending applications and herein, show that where starch is reacted according to our new processes and preferably by refluxing with an alcoholic solution of alkali hydroxide for a sufficient time and under controlled conditions, an alkali metal starchate compound (2-alkali metal starchate) is formed which contains approximately one gram atom of alkali per structural unit, i. e. 162 g. in the case of starch.

Investigation of the 2-monoalkali metal starchate (when tested by titration and chemical reactions) definitely proves that the starch derivative formed is not an addition or coordinated compound but is a true alcoholate of starch. This is further borne out in that the 2-monoalkali metal starchates (particularly the sodium or potassium starchates) produced have been found to be adapted as disclosed herein for use as starting compounds in making other metallic derivatives, ethers, esters, and other typical compounds.

One of the most outstanding characteristics of the monosodium starchate made according to the inventions being considered is that it possesses a very low viscosity as compared with a simple solution of starch in sodium hydroxide. The products formed by the mere addition of sodium hydroxide to starch do not show this low viscosity. Further it is found that the surface tension of water is lower when a 2-monosodium starchate product is introduced. The iodine coloration also changes from blue to red upon the formation of such 2-monosodium starchate and returns to blue on neutralization. Aqueous solution of such 2-monosodium starchate having increased quantities of combined sodium hydroxide are filterable to an extent which is unexpected. This is in direct contrast to conventional solutions of starch and alkali.

In preparing the 2-monoalkali starchates referred to above, we have investigated the effect of the following factors on the reaction.

*Nature of the solvent*

The solvent must be nonaqueous. As was pointed out in the copending applications above referred to and as will be discussed more in detail below, this is one of the most important factors.

It has been found that any of the following alcohols may be used, provided that certain other variables are sufficiently controlled. It must be understood that not all the solvents mentioned have the same utility in the process. It must also be understood that any nonaqueous solvent which will dissolve the alkali even in small amounts, is a suitable vehicle in which to carry out the reaction provided that certain other variables are sufficiently controlled.

*Alcohols usable*

| | |
|---|---|
| allyl | dimethyl isopropyl carbinol |
| iso-amyl | |
| n-amyl | di-n-propyl carbinol |
| sec.-amyl | di-iso-propyl carbinol |
| tert.-amyl | ethyl |
| anisyl | 2-ethyl butyl |
| benzhydrol | 2-ethyl hexanol |
| benzoyl carbinol | furfuryl |
| benzyl | n-heptyl |
| 2,3-butanediol | n-hexyl |
| n-butyl | sec.-hexyl |
| iso-butyl | lauryl |
| sec.-butyl | methallyl |
| tert.-butyl | methyl |
| sec. butyl carbinol | methyl amyl |
| β(p-tert. butyl phenoxy) ethyl | methyl butyl carbinol |
| | o-methyl cyclohexanol |
| capryl | m-methyl cyclohexanol |
| ceryl | p-methyl cyclohexanol |
| cetyl | 2-methyl pentanol-1 |
| 3-chloro-2 propenol-1 | methyl isopropyl carbinol |
| cinnamic | |
| crotyl | n-nonyl |
| cyclohexanol | n-octyl |
| decyl | octanol-2 |
| diacetone | phenyl-propyl |
| diethyl carbinol | n-propyl |
| dimethyl benzyl carbinol | iso-propyl |
| | tetrahydrofurfuryl |
| dimethyl ethynyl carbinol | triethyl carbinol |
| | triphenyl carbinol |
| dimethyl n-propyl carbinol | |

*Various polyhydric alcohols usable* ethylene glycol
ethylene glycol monomethyl ether
ethylene glycol monoethyl ether
ethylene glycol monobenzyl ether
ethylene glycol monobutyl ether
diethylene glycol diethylene glycol monomethyl ether
diethylene glycol monoethyl ether
diethylene glycol monobenzyl ether
diethylene glycol monobutyl ether
di-propylene glycol
glycerol
glycerol α-n-butyl ether
glycerol α,α'-dimethyl ether
glycerol α,γ-diphenyl ether
glycerol α-monomethyl ether
hexamethylene glycol
2-methyl 2,4-pentanediol
propylene glycol
triethylene glycol
trimethylene glycol It is clear therefore that all nonaqueous solvents capable of dissolving the alkali to an extent comparable with the dissolving of sodium hydroxide to the extent of 0.04 N or higher are satisfactory.

Some of the lower alcohols such as methanol, and to a lesser degree ethanol, propanol, etc. which readily give up a hydrogen ion in solution are not satisfactory with all types of alkali because of the relatively high acidity of such alcohols.

Temperature

Any temperature from 80–81° C. up to about 115° C. in an open or closed system, which permits volatilization of the water produced in the reaction produces 2-monosodium starchate. If the system is closed so that the water evolved in the reaction is retained in the reaction mixture, then the reaction will yield 2-monosodium starchate at any reasonable temperature above 80–81° C., up to the dextrinization temperature (unknown in nonaqueous solvents but perhaps to 200° C. or higher). Somewhere above about 115° C., in an open system, a reaction occurs on the number three carbon atom and in such cases (as later pointed out herein) the product is no longer 2-monosodium starchate. Under strongly dehydrating conditions (e. g., with alcoholates), this monoalkali reaction can be driven to completion at temperatures lower than 80° C. The raising of the temperatures up to about 80–81° C. is another of the most important considerations.

Pressure

Apparently there is but very very slight volume change occurring in the monoalkali reaction. Pressures up to 55 lbs. have been used with no effect on the course of the reaction or upon the product produced by the reaction. It is very probable that any practical pressure may be used provided the temperature and other requirements are not violated.

Time of reaction

The time of reaction varies with the solvent chosen. With ethyl alcohol any time beyond two hours does not alter the course of the reaction nor the character of the product. With butanol, the reaction is complete well before the butanol (technical grade) reaches the boiling point of 115° C. A generalization may be made in that the reaction is completed within two hours at 80–81° C. or instantaneously at 81° C. or higher under pressure regardless of the nature of the solvent.

Alkali concentration

It has been repeatedly demonstrated that at temperatures under the temperature of 115° C. and unless special means are provided to remove water, the reaction is independent of alkali concentration and the same product is always obtained provided there is sufficient alkali present to satisfy the requirements of the product. At the lower temperature range (i. e. 80° C.), it is advisable to use an excess of alkali in order to complete the reaction within the two hour period. At the higher temperature range, i. e. 81–115° C., only the amount of alkali approaching the stoichiometric equivalent is necessary or desirable. The mother liquor from the latter reaction always shows a faint alkalinity of approximately 0.04 N.

Nature of the alkali

Of the alkalies, only ammonia fails to react. Sodium and potassium hydroxide, sodium methylate, sodium ethylate, sodium propylate and sodium butylate all yield chemically similar products. Any caustic alkali or alkaline reacting material having an ionization constant of $2 \times 10^{-5}$ or greater will react provided that it is more than very slightly soluble in the chosen reaction media and also provided that the molecular size of the reacting molecule is not too large to locate itself in position to react with the starch.

Nature of the carbohydrate

Similar reaction products were prepared using waxy rice, yucca, sago, arrowroot, sweet potato, potato, corn, wheat, tapioca and amioca starches; a series of thin boiling starches; wheat, potato, tapioca and corn dextrins; cotton, linen, jute and ramie cellulose; sucrose; dextran; α-methyl glucoside and inulin.

Thus as pointed out in the copending applications, an alkali metal atom can be substituted on the number two carbon of the basic starch unit by treating starch (or similar natural or synthetic carbohydrates) in approximately stoichiometric quantities, with an alkali or alkaline reacting material (having an ionization constant of $2 \times 10^{-5}$ or greater) in a nonaqueous solvent (containing enough of the alkali in solution to produce 0.04 N or higher) at a temperature of 80° C. or higher (with or without agitation) for a period of two hours or longer. In such cases, a reaction will occur on the second carbon atom which will go practically to completion, provided alkali is present in sufficient quantity to permit one mole of alkali to react with one mole (162 grams) of carbohydrate. Under certain described exceptions, the temperature may be under 80° C. and under other described conditions the time may be under two hours.

POLYALKALI METAL CARBOHYDRATES

We have now also discovered that if under substantially the same conditions, a carbohydrate be reacted with an alkali hydroxide or other similar alkaline reacting material of the kinds listed above in a nonaqueous solvent and the temperature is kept at 115° C. or preferably higher (with or without agitation) for a period of one hour or longer with provision for the removal of water formed in reaction, a reaction will occur both on the number two carbon atom and on the number three carbon atom which will go practically to completion provided that the alkali is present in sufficient quantity to permit two moles of alkali to react with one mole (162 grams) of starch. The product of this reaction we designate as a 2,3-polyalkali metal starchate.

We have also discovered that by a proper combination of the process referred to above as the "ammonia process," with the process of producing the 2-alkali metal starchate described above and in said copending applications or by a combination of said ammonia process with the above-referred-to process of producing the 2,3-polyalkali metal starchates, we are able to produce controllably any one of many alkali metal starchates and derivatives therefrom in which selected alkali metals or substituted groups are added on the 2,3 and 6 positions, thus producing 2,3,6-starchates.

Figure 1:
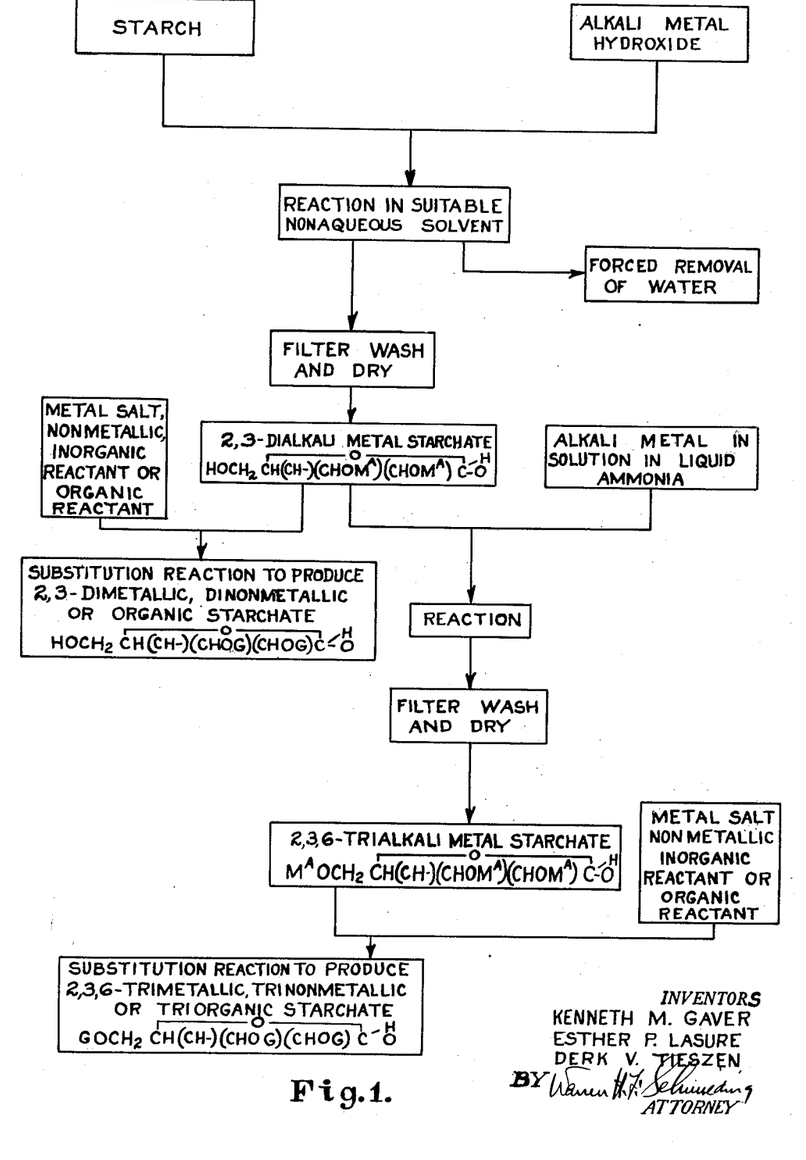
Fig. 1 is a flow sheet illustrating a process of forming disubstituted and trisubstituted derivatives of starch.

Referring now to Fig. 1 for a detailed description of some of the processes of our inventions, it may be seen that the diagram there shown illustrates a process wherein starch is initially reacted with an alkali metal hydroxide. This is an example of the reaction of any carbohydrate with any suitable alkali or alkaline reacting material. In such process, we take starch or other suitable carbohydrate and react it with an alkali hydroxide in a nonaqueous solvent. We provide for the forced removal of water. As one preferred way of accomplishing this removal of water, we may heat to a temperature of 115° C. or preferably higher. We then filter, wash and dry. Thereby we obtain a 2,3-dialkali metal starchate. From this we can obtain by substitution either a dimetallic starchate, a dinonmetallic inorganic starchate, or a diorganic starchate. By reacting the dialkali starchate with an alkali metal in solution in liquid ammonia, filtering, washing and drying, we can obtain a trialkali metal starchate and this can also be converted to a trimetallic, trinonmetallic or triorganic starchate.

If desired the substitution reaction may be accomplished immediately after the alkali hydroxide starch reaction without at such time filtering, washing and drying. For example, an anhydrous metal salt may be mixed in the reaction mixture either with or without additional anhydrous solvent and heated to a temperature of 115° C. or higher to accomplish the substitution of the nonalkali metal for the alkali metal.

The triorganic starchate may also be obtained from the dialkali starchate by the following procedure. The dialkali starchate may be converted into a diorganic starchate by substitution. Thereafter the diorganic starchate may be converted into the triorganic starchate by substituting an organic substituent in place of the hydrogen atom positioned on the number six carbon atom by any one of several known methods of alkylation of starch such as are illustrated by the following:

1. Reaction of the diorganic starchate with methyl iodide and silver oxide.
2. Reaction of the diorganic starchate with dimethyl sulphate and sodium hydroxide.
3. Reaction of the diorganic starchate with dimethyl sulphate and barium hydroxide.
4. Reaction of the diorganic starchate with diazomethane.
5. Reaction of the diorganic starchate with alkali metal in liquid ammonia to form a monoalkali diorganic starchate and reaction thereof with an organic halide.

*Nature of the alkalies*

The alkaline reacting material is preferably an alkali hydroxide or an alkali alkoxide although other alkaline reacting materials such as quaternary bases are suitable. Suitable alkali hydroxides are sodium hydroxide, potassium hydroxide, rubidium hydroxide, caesium hydroxide or lithium hydroxide. Ammonium hydroxide is unsuitable.

Any alkali alkoxide (alcoholate) may be used. An alkali alcoholate dissolved in the corresponding alcohol is particularly efficient. For example, sodium butylate dissolved in butanol reacts at elevated temperatures according to the following equation:

Thus the water which is often formed by our reaction is not formed. Any water present would react with the butylate to form sodium hydroxide and more of the solvent Sodium ethylate would react similarly. Under such circumstances it seems that the reaction may be driven at a temperature below 115° C.

*Nature of solvent*

For the 2,3 polyalkali metal starchate reaction substantially all nonaqueous solvents (for examples, see the list of solvents useful in the monoalkali reaction above) capable of dissolving the alkali to an extent comparable with the dissolving of sodium hydroxide to the extent of 0.04 N or higher, are satisfactory. The solvent, however, must be thoroughly anhydrous. It may be noted, however, that the lower alcohols such as methanol, ethanol, propanol, etc. which readily give up a hydrogen ion in solution may not be used. This is partly because of the lower boiling points of such alcohols but more especially because of the fact that they are more acid than the hydrogen substitutent of the number three carbon. We known that the hydrogen substituent on the number three carbon is less acid than the number two carbon hydrogen substituent.

Thus when a starch or a similar carbohydrate, naturally or synthetically derived is treated with a solution of an alkali or alkaline reacting material having an ionization constant of $2 \times 10^{-5}$ or greater in a nonaqueous solvent for the alkali at a temperature of 115° C. or preferably higher, with or without agitation, for a period of one hour or longer with a provision for the removal of water formed in the reaction, a reaction will occur on both the $C_2$ and $C_3$ carbon atoms which will go practically to completion provided that the alkali is present in sufficient quantity to permit two moles of alkali to react with one mole (162 grams) of starch. The solvents discussed above as suitable for the formation of the monosodium starchate are suitable for the formation of the dialkali starchate except for the differences in temperature and in acidity. It is essential, however, that the water evolved in the reaction be removed as rapidly as it is formed. It must also be understood that only those alcohols boiling at 115° C. or above are most suitable for the reaction except where some other means has been devised to remove the water.

*Temperatures*

Figure 4:
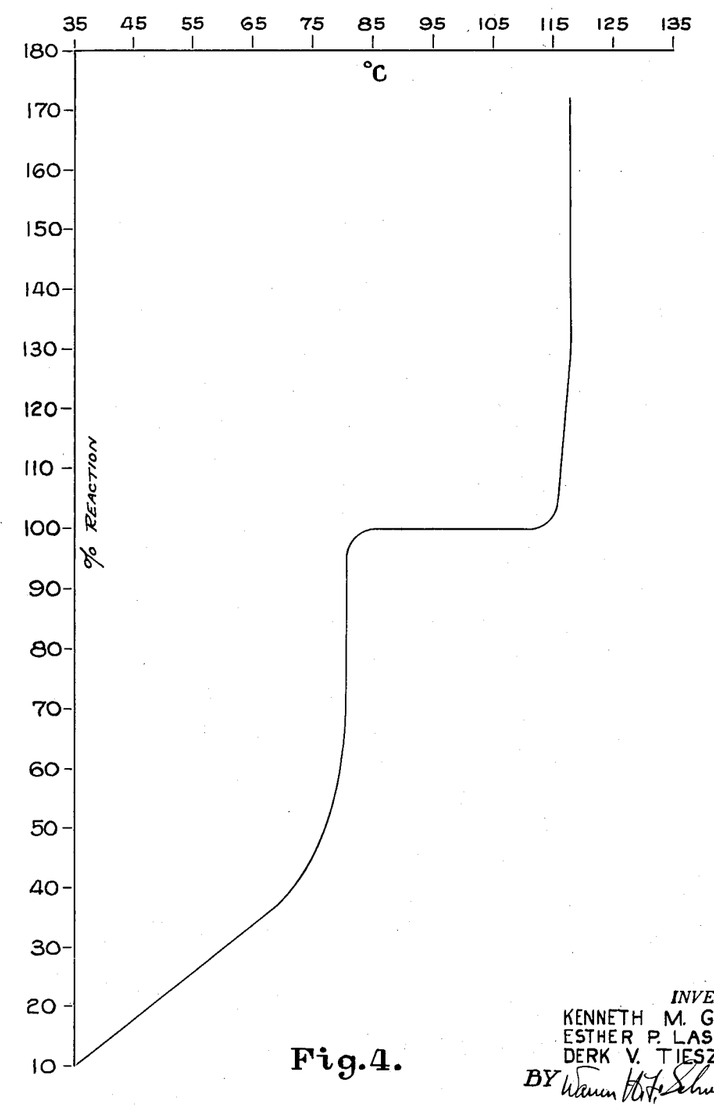
Fig. 4 is a curve indicating the effect of temperature on the reaction showing the percentage of the alkali added at various temperatures when starch is reacted with solutions of an alkali hydroxide in butanol.

Unless special means are provided for removing the water formed by the reaction, a temperature of 115° C. is necessary. In the absence of special means for removing water, the disodium starchate does not seem to be formed at temperatures below 115° C. However, if special means were provided for removing water, some disodium starchate might be formed at temperatures ranging below 115° C. As stated above, the water formed by the reaction is readily removed by distillation at 115° C. and the reaction is readily effected at that point. The curve shown in Figure 4 indicates the progress of the reaction at various temperatures. The points marked on the curve were plotted from tests. For instance at 35° C. even though the experiment was continued for several days, only 10% of the alkali was added to the starch. So at 60° C., only 30% was added and at 73° C., only 40% was added, etc. At none of the tests below 80–81° C. was there any evidence observed that water was formed. However, at about 80–81° C. the entire 2-monosodium starchate reaction was completed. No further sodium is added at any temperature below about 115° C. except when special means were provided to remove the water formed. At temperatures of 115° C. or higher the 2,3 disodium starchate is formed. It is evident that at temperatures below 80–81° C. the only reaction is that represented by the equation (addition):

$$C_6H_{10}O_5 + NaOH \rightarrow C_6H_{10}O_5 \cdot NaOH$$

At about 80–81° C. a dehydration reaction occurs as follows:

$$C_6H_{10}O_5 \cdot NaOH \rightarrow C_6H_9O_5Na + H_2O$$

Finally, as the temperature reaches about 115° C. or higher a third reaction occurs according to the equation $$C_6H_9O_5Na + NaOH \rightarrow C_6H_8O_5Na_2 + H_2O$$

As we have indicated, this $C_6H_8O_5Na_2$ starchate has a structural formula of No evidence was obtained which indicated that the hydrogen substituent of carbon six would react under these conditions.

*Pressures, time of reaction, alkali concentration, carbohydrates*

Although as stated above, pressure does not seem to play any role in either aiding or hindering the reaction on the number two carbon, yet by preventing the boiling away of the water formed, pressure prevents the reaction on the number three carbon. Nevertheless it is our belief that pressure plays no role in the reaction except indirectly by preventing the removal of water.

The time for the reaction varies with the rate at which the water is removed. Generally the same product is obtained from a reaction regardless of the time. In our tests the time has varied from two to fifty-six hours.

The same product is obtained always provided there is sufficient alkali present to satisfy the requirement of the product. All of the alkali need not be in solution at any one time provided there is enough in solution at all times to provide a solution of 0.04 N.

Of all the alkalis tried only ammonia fails to react. Sodium hydroxide and sodium butylate yield identical products. Any caustic alkali or alkaline reacting material having an ionization constant equal to $2 \times 10^{-5}$ or greater will react provided it is more than slightly soluble in the chosen reaction media and also provided that the molecular size of the reacting molecule is not too large to locate itself in position to react with the starch. The acidities of methanol and ethanol and probably propanol are so great that it appears impossible to prepare the di-metallic compound with alcoholates of these alcohols. Similar reaction products are obtained using sago, arrow root, sweet potato, potato, corn, wheat, rice, tapioca and amioca starches; a series of thin boiling starches; wheat, potato, tapioca and corn dextrins; dextran; cellulose such as linen, cotton, jute and ramie; and inulin. Ribose, glucose, sucrose and other sugars yielded products which were similar by weight yield and analysis of the product.

The water formed by the reaction may be removed by distillaiton or by any other strongly dehydrating action. For example it may be removed by reaction, as by absorption. If sodium butylate is mixed with sodium hydroxide in solution in butanol, or if sodium ethylate is mixed with sodium hydroxide in solution in ethanol the water formed is removed to produce more alcohol and alkali. The latter case thus proceeds according to the equations:

(1) $2NaOH + C_6H_{10}O_5 \rightarrow C_6H_8O_5Na_2 + 2H_2O$
(2) $2NaC_2H_5O + 2H_2O \rightarrow 2C_2H_5OH + 2NaOH$

Although dilution by the use of solvents is a satisfactory means of removing water where only the monoalkali starchate is being formed yet dilution alone is not sufficient where it is desired to form the dialkali metal starchate.

Although the filter, wash and drying steps are not necessary for the formation of the dialkali metal starchate yet such steps are desirable for the purification of the product and aid in subsequent manipulations thereof.

After the preparation of the 2-3 dialkali metal starchate it may be transformed into 2-3-6 trialkaline metal starchate by a reaction with an alkali metal dissolved in liquid ammonia. The alkali metal may be the same as that which is substituted on the number two and number three carbon atoms of the starch in the reaction thereof with the alkali metal hydroxide or it may be another suitable alkali metal.

An alkali metal dissolved in liquid ammonia reacts wtih native starch, glycogen, inulin, lichenin, manitol, α-methyl glucoside, etc. (the "ammonia process") to substitute alkali metal on the hydroxyl group of the number six carbon atom only. Also where a substitution has been made previously on the hydroxyl groups on the number two carbon atom and the number three carbon atom of the above or any other carbohydrate or similar substance having only three free hydroxyls, the alkali metal dissolved in ammonia reacts only with the hydroxyl group on the number six atom. Thus although in the cases of other carbohydrates, etc., the "ammonia process" will usually substitute the alkali metal on all of the free hydroxyl groups indiscriminately yet where the hydroxyls of the number two carbon and the number three carbon have previously been substituted by our process, the ammonia process reacts only on the number six carbon atom even with such other carbohydrates (e. g. cellulose, cellulose ethers and simple sugars, etc.). Where a 2-monoalkali starchate is first prepared, this 2-monoalkali starchate may be reacted with an alkali metal in solution in liquid ammonia to substitute the metal on both the number three and the number six carbon. Thus as will be subsequently more fully explained in connection with Fig. 2, a 2-3-6 trialkali metal starchate may also be formed by the reaction of a 2-monoalkali starchate with an alkali metal in solution in liquid ammonia provided the reaction is continued for a period of time sufficient to complete the reaction and provided sufficient alkali metal is present for such completion. As stated above in connection with the formation of the dialkaline metal starchate, it is preferable that the product be filtered, washed and dried although this step is not absolutely necessary.

Referring still to Fig. 1 it may be repeated that the reaction of the alkali metal hydroxide with the starch produces a 2,3-dialkali metal starchate having a formula of where $M^a$ is an atom of an alkali metal. The further reaction of this product with an alkaline metal dissolved in liquid ammonia gives a 2,3,6-trialkali metal starchate having a formula of

Figure 2:
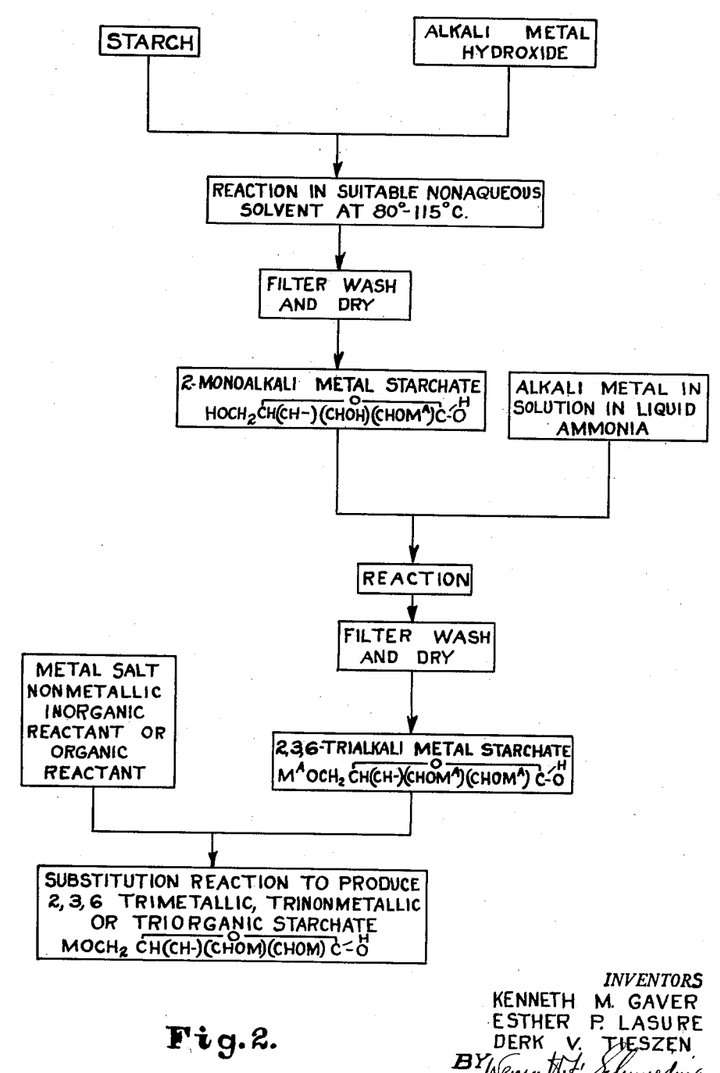
Fig. 2 is a flow sheet illustrating an alternative process of forming the same trimetallic derivatives of starch as are formed by the process illustrated in Fig. 1.

Referring now to Fig. 2 it will be noted that the first step is somewhat the same as in the process of Fig. 1. However, there is no forced removal of water and the reaction takes place at temperatures below 115° C. The second step (dehydration) of the reaction (as stated above) is not initiated until a temperature of approximately 81° is reached and although water is formed by the reaction at that temperature no special steps are necessary to insure its removal in the process of forming the mono alkali derivatives. Without the forced removal of water a reaction does not occur on the number three carbon atom and unless steps are taken to insure the removal of water no dialkali metal starchate is produced at any temperature below about 115° C. It should be repeated that at a temperature of 115° C. or above, the water formed by the reaction is distilled off and dialkali starchate is formed. However, at lower temperatures where there are no special precautions for the removal of water, pure monoalkali starchate only is formed.

After formation of the 2-monoalkali starchate, this product may be reacted with an alkali metal in solution in liquid ammonia substantially as was described above in connection with Fig. 1 with the difference that sufficient alkali metal must be applied in order that two moles of alkali metal may react with each mole of the 2-monoalkali starchate and sufficient time must elapse for the reaction to occur on both the number three and the number six carbon atoms. After the reaction the product is filtered, washed and dried to obtain a trialkali metal starchate similar in all respects to trialkali metal starchate described above as obtained in connection with the process illustrated in Fig. 1.

Thus by the first reactions described above in connection with Fig. 2, we obtain a 2-monoalkali metal starchate having a structural formula of By the subsequent reaction of the above starchate with an alkali metal in liquid ammonia we obtain a 2,3,6-trialkali metal starchate having a structural formula of which is the same product as that described above in connection with the reaction described in Fig. 1.

Either of the two polyalkali metal starchates described herein (i. e. the dialkali metal starchate, and the trialkali metal starchate regardless of the method by which the latter is formed) may be converted by a substitution reaction into a polymetallic (non-alkali) starchate, a polynonmetallic starchate, or an organic starchate by a substitution reaction. To obtain a nonalkali metal starchate, either of these polyalkali metal starchates may be reacted with an appropriate metal salt as is indicated in Figs. 1 and 2. The substitution may be accomplished in any case by stirring the starchate in a nonaqueous solution with stoichiometric quantities of a suitable metallic, nonmetallic or organic salt at a temperature of 115° C. or higher with vigorous agitation. To obtain a nonmetallic inorganic polysubstituted starchate (that is to say, an inorganic 2,3-distarchate (nonmetallic) or an inorganic 2,3,6-tristarchate (nonmetallic)) we react the polyalkali starchate with a nonmetal inorganic reactant as is also indicated in Figs. 1 and 2. Also, these polyalkali metal starchates may be reacted with organic salts to substitute an organic group for the alkali metal atoms as is also indicated in Figs. 1 and 2. Thus we can react the alkali metal starchates with any metal salt, or any other organic or inorganic reactant, and obtain corresponding organic or inorganic metal or nonmetal starchates.

Figure 3:
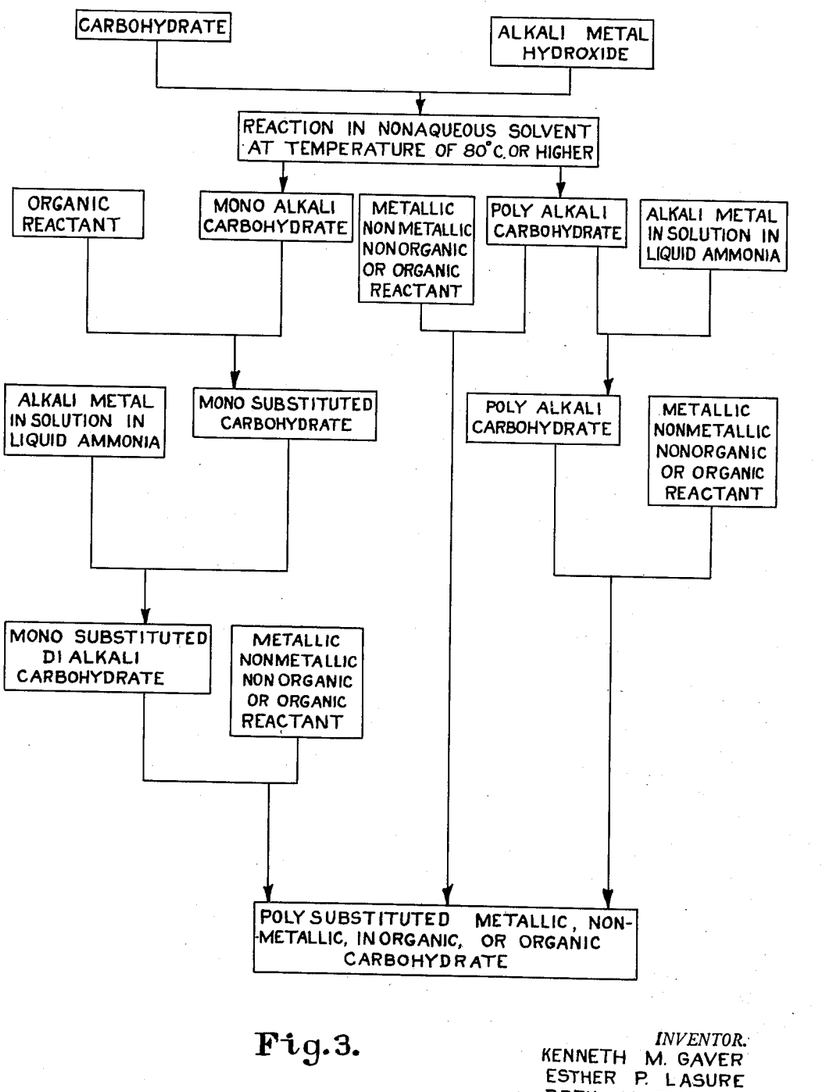
Fig. 3 is a similar flow sheet illustrating the application of our processes to carbohydrates generally including sugars, pentosans (simple, derived and mixed), dextrins, starches, cellulose, lichenin, dextran, glycogen, levulosans, mixed hexosans, mannosans, galactosans, etc. and conjugated saccharides such as gums, glucosides and tannins.

We may, if desired, as is suggested in Fig. 3 (which shows our reaction as applied to carbohydrates generally) after obtaining the 2-monoalkali metal starchate (Fig. 2) react this with a salt to substitute for the 2-alkali atom and then subsequently react with the alkali metal in solution in liquid ammonia to obtain as an intermediate product a 2-substituted 3,6-dialkali metal starchate and then subsequently substitute for the 3,6-alkali to obtain the 2,3,6-substituted product.

The following carbohydrates react with alkali metal hydroxides and similar alkaline material and with alkali metal dissolved in liquid ammonium in all respects similarly to starch; glycogen; inulin; lichenin; glucosides such as α-methyl glucoside; and derived saccharides. Mannitol reacts similarly. Therefore as appears in Fig. 3 the reactions thereof to produce a 2-monoalkali metal carbohydrate, a 2,3-dialkali metal carbohydrate and a 2,3,6-trialkali metal carbohydrate correspond in all respects to the corresponding reactions of starch. Other carbohydrates which do not react in all cases in the same manner as do the starches and in fact react differently from starch when mixed as native materials with alkali metal dissolved in ammonia are: cellulose; the sugars including the monosaccharides, the disaccharides, the trisaccharides and the tetra saccharides; polyamyloses; the gums, the tannins and the derived saccharides. Nevertheless when such materials are treated according to our processes, we have proved that many of them react (and, based on our investigations, we are convinced that all of the others react) in exactly the same manner as starches and produce products which so far as their structure permits, resemble the starchates produced when our processes are applied to starches. They may be seen by reference to Fig. 3. In the following eight paragraphs, our proved results and supported conclusions are set out.

Where the reacting compound is a monosaccharide or where in the case of a polysaccharide the molecular building unit of the carbohydrate is a ketone alcohol rather than an aldehyde alcohol and where such unit has less than six carbon atoms or more than six carbon atoms, the resulting structure varies somewhat.

Where an aldehyde free sugar (monosaccharide) is reacted, the initial reaction is on the number two carbon; as the temperature is raised to 115° C., the number three carbon atom is reacted; and on further treatment with alkali metal in liquid ammonia, the 4 and 6 carbons are reacted to produce a 2,3,4,6 reaction product. If the ammonia process is applied either before or immediately after the reaction on the number two carbon the metal replaces free hydrogen on all of the four or three free hydroxyl groups to give the same product. Where a ketonic free sugar (monosaccharide) is reacted, the initial reaction is on the number three carbon; as the temperature is raised to 115° C., the number four carbon reacts; and on treatment with alkali metal in liquid ammonia, the 1 and 6 carbons react. The same product may be obtained by the ammonia process either before the initial reaction on the number three carbon or immediately after it.

Where a ketonic polysaccharide is treated, the initial treatment reacts the number three carbon; as the temperature is raised to 115° C., the number four carbon reacts; and on subsequent treatment with alkali metal in liquid ammonia, the 6 carbon only reacts. If the liquid ammonia treatment is applied before the reaction on the number four, the metal replaces the hydrogen of the hydroxyl groups on carbons numbers four and six.

Where there is a polysaccharide with six carbon atoms (as, for example, a hexosan) and the compound is an aldehyde alcohol, a reaction with an alkali metal hydroxide in a nonaqueous solvent at a temperature of from 80–81° C. causes a substitution of an alkali atom in place of the hydrogen of the number two carbon hydroxyl. Thereafter if the 2-monoalkali metal carbohydrate so formed is reacted with an alkali metal in solution in liquid ammonia, a 2,3,6-trialkali metal carbohydrate is formed. Moreover, if such a carbohydrate is reacted with an alkali metal hydroxide in a nonaqueous solvent with forced removal of water at a temperature of 115° C. or higher, a 2,3-dialkali metal carbohydrate will be formed. Subsequent reaction of this last named product with an alkali metal dissolved in liquid ammonia produces a 2,3,6-trialkali metal carbohydrate. If on the other hand the product is ketonic (e. g. a levulosan) the initial reaction is on the number three carbon atom and the subsequent reactions are on the 4 and 6 carbon atoms respectively. All of these products may then be reacted with either a metal salt, an inorganic nonmetal reactant, or an organic reactant to produce the corresponding nonalkali metal carbohydrate, inorganic nonmetal carbohydrate or organic carbohydrate.

If the original carbohydrate being treated has less than six carbon atoms, the first hydroxyl group to react will be the hydroxyl group that is adjacent to the carbonyl group or potential carbonyl group. Similarly the second hydroxyl group to react will be the hydroxyl group which is the second nearest to the carbonyl group or potential carbonyl group. In a five carbon polymerized carbohydrate or polysaccharide (such as, for example, a pentosan), there are only two free hydroxyl groups. There will be no reaction in such cases on any other hydroxyl than the two free hydroxyls. Moreover, inasmuch as in four carbon polymerized carbohydrates and polysaccharides such as the tetrosans, there is only one free hydroxyl, no polysubstituted product is possible therewith. In reactions involving polymerized carbohydrates and polysaccharides such as the heptoses, octoses, nonoses, decoses, etc., where there are more than six carbon atoms to the unit, there are also more than three free hydroxyl groups. In such cases, the first hydroxyl group to react is that which is nearest the carbonyl group or potential carbonyl group, the second hydroxyl group to react is that which is next nearest to the carbonyl group or potential carbonyl and finally all of the other hydroxyl groups will react when treated with metallic alkali in ammonium. The above applies to the polymerized carbohydrates and polysaccharides including disaccharides, trisaccharides, tetrasaccharides, polyamyloses, dextrins, cellulose, etc.

Thus the six carbon monosaccharides (hexoses) usually have one more free hydroxyl than do the six carbon polysaccharides and polymerized carbohydrates such as dextrin, starch, cellulose, etc. The five carbon monosaccharides (pentoses) have the same number of free hydroxyls as the six carbon polysaccharides. Although the number of carbon atoms may be different, yet the reactions involved are substantially the same.

On heating a tetrose with an alkali metal hydroxide in a nonaqueous solvent to a temperature of 80–81° C., there is a reaction by which the alkali metal is substituted in place of the hydrogen of the hydroxyl group which is adjacent to the carbonyl group. On further heating a mixture of the carbohydrate with the alkali metal hydroxide in a nonaqueous solvent to a temperature of 115° C. or higher with provision for the removal of water there is a further reaction to substitute an atom of the alkali metal also on the hydroxyl group which is next adjacent to the first named hydroxyl group. Where alkali metal is substituted in place of only one hydrogen, alkali metal may thereafter be substituted for the hydrogen of the remaining free hydroxyl groups by mixing the product with an alkali metal in solution in liquid ammonia.

Thus in the case of a tetrose such as erythrose, the reaction of the sugar with an alkali metal hydroxide at a temperature of from 80–81° C. creates a product believed to have the formula of

A reaction of this product with an alkali metal in solution in liquid ammonia will give a product believed to have the formula of

Also the reaction of the original erythrose with an alkali metal hydroxide at a temperature of 115–120° C. in a nonaqueous solvent with provision for the removal of water will give a product believed to have the structural formula of Obviously where there are more free hydroxyl groups in the starting compound, the completed reaction (including the substitution by the process of reacting with an alkali metal in solution in liquid ammonia) gives a product having a great many more metallic atoms substituted. For example, mannoheptose having a formula of when reacted with an alkali metal hydroxide at a temperature of 80–81° C. produces a product appearing to have a formula of If similarly reacted with alkali metal hydroxide in solution in a nonaqueous solvent at a temperature of from 118–120° C. with provision for removal of water, a product is produced believed to have a formula of

HOCH$_2$(CHOH)(CH)(CHOH)(CHOM)(CHOM)CHOH

If then reacted with an alkali metal in solution in liquid ammonia, the product having an apparent formula of

MOCH$_2$(CHOM)(CH)(CHOM)(CHOM)(CHOM)CHOH is obtained. It will be noted that this is the same product as has been claimed to have been obtained when a mannoheptose was reacted with an alkali metal (Muskat) in solution in liquid ammonia. However, the intermediate products have never been disclosed in the prior art, the process for forming the final product is different from anything disclosed in the prior art and as suggested above, it is possible to substitute an alkali metal on the carbon atom (or on the carbon atoms 2 and 3) different from the alkali metal which is substituted on the remaining carbon atoms.

In the case of all of the polyalkali metal substituted carbohydrates, either metallic atoms or groups, nonmetallic inorganic atoms or groups, or organic groups may be substituted for the alkali metal atoms by the procedure outlined above. Both immediately before and after this substitution is accomplished with any carbohydrate (aldehyde type) excepting the monosaccharides and those having less than six carbon atoms, we have a compound having units having the general formula of

G'O—R—CH(CH—)(CHOG)(CHOG)C—O where G is a substituent selected from a group consisting of monovalent alkali metals, monovalent nonalkali metals, monovalent metallic groups, monovalent inorganic nonmetal elements and groups, and monovalent organic substituents; where G' is a substituent selected from a group consisting of hydrogen, monovalent alkali metals, monovalent nonalkali metals, monovalent metallic groups, monovalent inorganic nonmetal elements and groups, and monovalent organic substituents; and where R comprises a bi-valent hydrocarbon group, having a formula of $$C_xH_{x+1}O_{x-1}G'_{x-1}$$

$x$ representing any integer.

Both immediately before and after the substitution is accomplished with any similar monosaccharide having six carbon atoms or more we have a compound having the general formula of

G'O—R—CH(CHOG')(CHOG)(CHOG)CHOG' where G, G' and R are as defined above.

Following are examples of illustrative processes performed according to our inventions producing in many cases new products according to our invention but producing in other cases known products by novel methods.

EXAMPLE I

*Disodium starchate-2,3*

190 grams rice starch (equiv. 162 g. pure starch)
900 ml. butanol
40 grams NaOH

Heat with distillation and vigorous agitation at 92–95° C. whereby the starch moisture and the water liberated in the reaction is removed as the butanol-water azeotrope (B. P. 92.7° C. and 57.6% butanol). This step gives 96% yield of 2-monosodium starchate. Another 40 gm. NaOH is added and the temperature raised. As the second distillation proceeds fresh dry butanol is added to replace that removed by distillation. By the time the boiling point of the mixture reaches 118° C. usually 1000 ml. of fresh dry butanol have been added to the reaction system. The mixture is filtered and the filtercake washed with a minimum of dry butanol and then with ether and air dried with adequate protection from air, moisture and acidic gases. Air dry weight 218 g. (198 g. dry basis) and containing 37 g. of sodium. This step gives 60% yield of 2,3-disodium starchate which product is a buff, granular free flowing, caustic material. It is extremely hygroscopic and most easily decomposed by moisture and acidic gases. It gives a brown gummy material on long exposure even in dry air.

EXAMPLE II

*Dimethyl starchate-2,3*

The disodium starchate, as prepared in Example I, was treated under pressure, with 300 g. methyl iodide (1.3 times the calculated quantity, i. e. 227 g.). The product of this reaction was again subjected to the process described in Example I, then with methyl iodide as above. After four repetitions the reaction was, for all practical purposes, complete in that the methoxyl content was practically stoichiometric to the sodium hydroxide entering the starch molecule.

The product, methylated as completely as possible under these conditions, was freed of the sodium iodide by extraction with acetone and the extracted product air dried with adequate protection from moisture. Air dry weight 203 g. (184.4 g. dry basis) and contained 49.6 g. methoxyl. The overall yield in this case was 80% of theory.

The product was dull white, extremely hygroscopic, soluble in water (precipitating on boiling and redissolving on cooling), gives an intense blue coloration with iodine.

EXAMPLE III

*Dicopper starchate-2,3*

The disodium starchate, as prepared in Example I, was suspended in 1000 ml. commercial diethyl ether. To this suspension was added 215 g. anhydrous copper chloride (stoichiometric quantity) and the mixture refluxed with vigorous agitation until the alkalinity has been consumed. The product was filtered out of the reaction mixture and washed with a little ether and air dried. The air dry weight was 565 g. (dry basis 508 g.) and contained 102 g. copper. If this product was extracted with 90% methanol, rewashed with ether and air dried, a sodium chloride-free product was obtained whose air dry weight was 454 g. (414 g. dry basis) and which contained 101 g. copper and 56.8 g. chlorine. The overall yield was 80% of theory. This product was a free flowing granular product, green in color, insoluble in water but hydrated in boiling water. It is stable to alkalies but readily decomposed by acids. It is an excellent mildewproofing material.

EXAMPLE IV

*Diarsenic starchate-2,3*

The disodium starchate, as prepared in Example I, was suspended in 500 ml. anhydrous diethyl ether. To this vigorously agitated suspension was slowly added a solution of 290 g. arsenic trichloride in 1000 ml. anhydrous diethylether. Generally it is not necessary to heat this mixture in order to complete the reaction but the mixture may be refluxed if necessary. The reaction mixture was filtered and the product washed with a little ether and air dried. The air dried weight was 643 g. (dry basis 585 g.) and contained 130 g. arsenic. If this product was extracted with 90% methanol, rewashed with ether and air dried, a sodium chloride-free product was obtained whose air dry weight was 540 g. (dry basis 490 g.) and contained 129 g. arsenic and 114 g. chlorine. Whereas 2-monoarsenic starch showed little toxicity towards rats, this product showed considerable toxicity but even so not what would be concluded from the arsenic content. The product was rather gummy and unstable, especially in the presence of moisture. The stability could be improved by replacing the chlorine with other radicals such as bicarbonate, thiocyanate, etc.

EXAMPLE V

Disodium pectate 200 gm. commercial pectin
900 ml. butanol
80 gm. sodium hydroxide Heat with vigorous agitation and distillation until the temperature reaches 100° C. The product is filtered off and washed with butanol and ether and air dried. Air dry weight 255 g. (dry basis 230 g.) and contained 43 g. of sodium. It resembled monosodium starch in its appearance and in its reactions. While not characterized further it is assumed that one mole of sodium hydroxide was consumed in the saponification of the methyl ester groups and neutralization of the carboxyl groups. From analogy to other applications of this reaction it must be assumed that the other sodium replaces the hydrogen on the hydroxyl of carbon 2.

EXAMPLE VI

Di-B-hydroxyethyl locust bean gum

The disodium alcoholate of locust bean gum was prepared as described in Example V and without filtering was treated with 160 g. of ethylene chlorohydrin. This mixture was heated to 92–93° C. for two hours and the reaction product was found to be neutral. It was filtered and washed with butanol and then with ether and air dried. Air dry weight 244 g. This product resembles the mono-B-hydroxyethyl starch in its appearance and properties. Cold aqueous dispersions of this ether do not gel on standing but rather form very viscous, clear dispersions.

EXAMPLE VII

Trisodium starchate-2,3,6

Monosodium starchate-2, was prepared as described in the first part of Example I. Eighteen grams (dry basis) of this material was dissolved in 500 ml. of liquid ammonia. Small pieces of sodium was added until the mixture remained intensely blue for 30 minutes. The excess sodium was destroyed with a little carbon dioxide. Slightly less than 5 g. of metallic sodium was required to cause the solution to remain blue.

While the amount of sodium consumed indicated the formation of trisodium starchate the product could not be analyzed. Even though this product could be filtered and washed with liquid ammonia it ignited spontaneously whenever attempts were made to dry it. The compound is known and characterized by its derivatives.

EXAMPLE VIII

Trimethyl starchate-2,3,6

Trisodium starchate was prepared as described in Example VII. This was methylated with methyl iodide according to usual procedures. The crude product was extracted with acetone to remove the sodium iodide by-product. The product was filtered, washed with ether and air dried to yield 25 g. (20 g. dry basis) of trimethyl starch.

EXAMPLE IX

Di-(benzyl trimethyl) ammonium starchate 190 gm. of corn starch (162 g. pure starch)
900 ml. butanol
245 g. benzyl trimethyl ammonium hydroxide This mixture was heated with vigorous agitation and distillation and there a reaction noted and water was evolved and the reaction gummed up somewhat. As the temperature rose to 92° C. this water was removed as the butanol azeotrope. At about 114° C. water again was evolved and this continued until the distillation temperature reached that of pure butanol. The product was filtered off, washed with a little butanol and ether and air dried with adequate protection from air, moisture and acidic gases. Air dry weight was 453 g. (dry basis 378 g.). The product resembled disodium starchate in its properties.

EXAMPLE X

Dipotassium-2,3, monosodium-6, starchate

The potassium was first introduced into the starch molecule as described in Example I by using molar equivalents of potassium hydroxide (56 g.) in place of the sodium hydroxide.

Sodium was then introduced into the remaining hydroxyl (on carbon 6) by means of the liquid ammonia-metallic sodium process as described in Example VII except that only half the quantity of sodium was required since only one hydroxyl was available for reaction.

This product could not be separated, dried and characterized because of its instability.

EXAMPLE XI

Poly-sodium sucrose 34.2 g. sucrose
750 ml. butanol
16 g. of NaOH

This mixture was heated with vigorous agitation. By the time the mixture reaches 92° C. one mole of NaOH has been consumed by one mole of sucrose. By the time the mixture reaches 100° C. there begins another slow evolution of water with the consumption of another mole of NaOH. At 112° C. the temperature remains constant for a considerable length of time while considerable amount of water was evolved. By the time the temperature reached 115° C. the heat was removed and the product contains 2 atoms of sodium in each sucrose molecule. By prolonged heating at 115° to 118° C. another sodium can be introduced into the molecule. Evidence indicates that the first sodium enters on C–2 of the glucose portion of the molecule, the second sodium enters on C–3 of the fructose portion and the third sodium enters on C–3 of the glucose portion of the molecule. Evidence further indicates that there is a marked tendency for a fourth sodium to enter the molecule.

EXAMPLE XII

*Dipotassium cellulose-2,3*

This product was prepared similar to the method described in Example IX.

170 g. of alkali soluble cellulose
900 ml. of butanol
110 g. of potassium hydroxide Air dry weight 235 g. (207 g. dry basis) and contained 47 gm. of potassium corresponding to a 60% overall yield. The yield is considerably lower than the corresponding reaction on starch.

EXAMPLE XIII

*Disodium inulin*

This product was prepared exactly as described in Example IX.

20 gm. commercial inulin
90 ml. butanol
8 g. sodium hydroxide

Air dry weight 2.25 g. (19.9 g. dry basis) and contained 3.8 g. of sodium corresponding to a 95% yield.

EXAMPLE XIV

*Tripotassium starchate-2,3,6*

Dipotassium starchate was prepared as described in Example IX.

190 g. wheat starch
900 ml. butanol
112 g. potassium hydroxide 23.8 g. of this product was dissolved in liquid ammonia and treated with approximately 4 g. of metallic potassium where upon the solution turned intensely blue. The excess potassium was destroyed with a little carbon dioxide and the product filtered and washed with a little liquid ammonia. Since this product spontaneously decomposes in air on drying it was characterized by its derivatives.

EXAMPLE XV

*Disodium dextrin-2,3*

This product was prepared exactly as described in Example IX.

190 g. corn dextrin
900 ml. butanol
85 g. of sodium hydroxide

From this there was obtained 200 g. (dry basis) of material analyzing to contain 38 g. of sodium which corresponded to 82% yield of disodium dextrin.

EXAMPLE XVI

*Completely etherified gum*

Di(B-hydroxyethyl) locust bean gum was prepared exactly as described in Example VI. All available hydroxyl groups were then etherified by repeated methylation with dimethyl sulfate and barium hydroxide in the usual manner. It should be pointed out that even the hydroxyl groups on the hydroxyethyl groups already introduced are likewise methylated just as are the unetherified hydroxyls originally present in the locust bean gum.

Much if not all of the subject matter of this application is disclosed but not claimed in our copending applications Serial No. 694,328, filed August 31, 1946, and Serial No. 707,318, filed November 1, 1946.

The products of this invention are useful in many ways. They have uses among others in sizing operations, as adhesives, as intermediates in the formation of plastics, as fillers, as lacquers and agents for similar coating operations.

While the forms of embodiments of the present invention as herein disclosed constitute preferred forms, it is to be understood that other forms might be adopted, all coming within the scope of the claims which follow.

We claim:

1. A method of making uniformly 2,3 substituted glucopyranose polymers comprising reacting glucopyranose polymers with alkali metal hydroxide in a substantially non-aqueous alcoholic system in which there is enough of the alkali to produce an 0.04 N solution and to permit two moles of alkali to react with each mole unit of carbohydrate and having an ionization constant of $2 \times 10^{-5}$ or greater at a temperature of 115° C. or higher; and removing water formed by the reaction of the alkaline reacting material with the carbohydrate.

2. A process of manufacturing polysubstituted carbohydrate products which comprises the steps of reacting a carbohydrate containing glucopyranose units each having a structural formula of with an alkaline reacting material selected from a group consisting of the alkali metal hydroxides in which there is enough of the alkali to produce an 0.04 N solution and to permit two moles of alkali to react with each mole unit of carbohydrate and having an ionization constant of $2 \times 10^{-5}$ or greater in a nonaqueous solvent at a temperature of 115° C. or higher; and removing water formed by the reaction of the alkaline reacting material with the carbohydrate.

3. A process of manufacturing polysubstituted compounds which comprises the steps of reacting cellulose with a solution of an alkali metal hydroxide at a temperature of 115° C. or higher in a substantially non-aqueous alcoholic system which has an ionization constant of $2 \times 10^{-5}$; wherein there is enough of the alkali in solution to produce an 0.04 N solution and to permit two moles of alkali to react with each gram-unit of such cellulose molecules and having an ionization constant of $2 \times 10^{-5}$ or greater; and removing water formed by the reaction of the alkaline reacting material with the cellulose.

4. A process of manufacturing polysubstituted carbohydrate products which comprises the steps of reacting a dextrin with alkali metal hydroxide at a temperature of 115° C. or higher in a substantially non-aqueous alcoholic system in which there is enough of the alkali to produce an 0.04 N solution and to permit two moles of alkali to react with each gram-unit of such dextrin molecules and having an ionization constant of $2 \times 10^{-5}$ or greater; and removing water formed by the reaction of the alkaline reacting material with the dextrin.

5. A process of manufacturing polysubstituted carbohydrate products which comprises the steps of reacting starch with alkali metal hydroxide at a temperature of 115° C. or higher in a substantially non-aqueous alcoholic system in which there is enough of the alkali to produce an 0.04 N solution and to permit two moles of alkali to react with each gram-unit of such starch molecules and having an ionization constant of $2 \times 10^{-5}$ or greater; and removing water formed by the reaction of the alkaline reacting material with the starch by evaporation.

6. A process of manufacturing polysubstituted compounds which comprises the steps of reacting a non-reducing sugar with alkali metal hydroxide at a temperature of 115° C. or higher in a substantially nonaqueous alcoholic system wherein there is enough of the alkali in solution to permit two moles of alkali to react with each mole unit of such sugar and to produce an 0.04 N solution having an ionization constant of $2 \times 10^{-5}$ or greater; and removing water formed by the reaction of the alkaline reacting material with sugar.

7. A process of treating a glucopyranose polymer which comprises mixing the glucopyranose polymer at a temperature of 115° C. or higher in a substantially nonaqueous alcoholic system with an 0.04 N or higher solution of an alkali metal hydroxide having an ionization constant of $2 \times 10^{-5}$ or greater and containing enough of the alkali in solution to permit two moles of alkali to react with each mole unit of carbohydrate; and removing water formed by the reaction.

8. A process of manufacturing polysubstituted carbohydrate products comprising the steps of mixing a glucopyranose polymer with alkali metal hydroxide at a temperature of 115° C. or higher in a substantially nonaqueous alcoholic system having an ionization constant of $2 \times 10^{-5}$ or greater and having sufficient alkali in quantity to permit two moles of alkali to react with each mole unit of carbohydrate; and removing water as formed.

9. A method of making uniformly 2,3,6-substituted glucopyranose polymers comprising reacting glucopyranose polymers with an 0.04 N solution of an alkali metal hydroxide having an ionization constant of $2 \times 10^{-5}$ in a nonaqueous alcoholic solvent containing enough of the alkali to permit two moles of alkali to react with each mole unit of carbohydrate at a temperature of 115° C. or higher so that water formed by the reaction is removed; and reacting the product with a solution of an alkali metal in liquid ammonia.

10. A process of manufacturing polysubstituted products of starch comprising the steps of mixing starch with a solution of alkali metal hydroxide at a temperature of 115° C. or higher in a substantially nonaqueous alcoholic system having an ionization constant of $2 \times 10^{-5}$ or greater in a nonaqueous solvent with sufficient alkali in quantity to produce an 0.04 N solution and to permit two moles of alkali to react with each mole unit of starch; and removing water as formed.

11. A process of forming a polysubstituted derivative of starch which comprises the steps of reacting starch with an 0.04 N or higher solution of alkaline reacting material selected from a group consisting of the alkali metal hydroxides having an ionization constant of $2 \times 10^{-5}$ or higher, in a substantially nonaqueous alcoholic solvent in which there is enough of the alkali to permit two moles of alkali to react with each mole unit of starch at a temperature of 115° C. or higher so that water formed by the reaction is removed; and mixing the product with a solution of an alkali metal in liquid ammonia.

12. A process of forming polyether derivatives of starch which comprises reacting starch by mixing it with alkali metal hydroxide at a temperature of 115° C. or higher in a substantially nonaqueous alcoholic system, the alkali reactant being supplied in sufficient quantity to maintain at least an 0.04 N solution with an ionization constant of $2 \times 10^{-5}$ and to permit two moles of alkali to react with each mole unit of starch to produce a polyalkali metal starchate and thereafter reacting the starchate with an organic halide to produce a polyether starchate by double decomposition.

13. A uniformly substituted dialkali metal starchate in which the alkali metal is uniformly substituted on the number 2 and number 3 carbon atoms.

14. A carbohydrate derivative consisting of dimetallic glucopyranose units in which an identical metal cation is attached to the number two and number three carbon atoms of substantially all units.

15. A carbohydrate derivative consisting of interlinked and polymerized substantially uniformly substituted glucopyranose units each having the following structural formula where each G represents an identical cation selected from the group consisting of alkali metal cations, ethereal salt cations, and cations of metal salts other than salts of alkali metals and ammonia.

16. A substantially uniformly substituted glucopyranose polymer consisting of interlinked and polymerized substantially uniformly substituted glucopyranose units, each having the following structural formula where each G is identical and represents an identical cation selected from the group consisting of alkali metal cations, non metal cations, alkyl ethereal salt cations, and cations of metal salts other than salts of alkali metals and ammonia and each G' is identical and represents a cation selected from the group consisting of hydrogen, cations derived from salt other than salts of alkali metals, salts of ammonium, and ethereal salts having an alkyl radical identical with the alkyl radical represented by G and where when G represents any other cation than an alkyl group, G' must be hydrogen.

17. A process of forming polyether carbohydrate derivatives which comprises reacting glucopyranose polymers with alkali metal hydroxide at a temperature of 115° C. or higher in a substantially nonaqueous alcoholic system in which there is enough alkali to permit two moles of alkali to react with each glucopyranose polymer unit and to maintain an 0.04 N solution having an ionization constant of $2 \times 10^{-5}$ or greater to produce a polyalkali metal carbohydrate; and thereafter reacting the polyalkali metal carbohydrate derivative with an ethereal salt at a temperature in the range of 78° C. to 118° C. whereby the salt cations replace the alkali metal cations to produce by double decomposition a polyether carbohydrate derivative.

18. A process of forming polyalcoholate derivatives which comprises reacting glucopyranose polymers with alkali metal hydroxide at a temperature of 115° C. or higher in a substantially nonaqueous alcoholic system in which there is enough alkali to permit two moles of alkali to react with each glucopyranose polymer unit and to maintain an 0.04 N solution having an ionization constant of $2 \times 10^{-5}$ or greater to produce a polyalkali metal carbohydrate; and thereafter reacting the polyalkali metal carbohydrate derivative with an inorganic metal salt other than a salt of an alkali metal at a temperature in the range of 78° C. to 118° C. whereby the salt cations replace the alkali metal cations to produce by double decomposition a polymetallic carbohydrate derivative.

19. A process of forming polysubstituted derivatives which comprises reacting glucopyranose polymers with alkali metal hydroxide at a temperature of 115° C. or higher in a substantially nonaqueous alcoholic system in which there is enough alkali to permit two moles of alkali to react with each glucopyranose polymer unit and to maintain an 0.04 N solution having an ionization constant of $2 \times 10^{-5}$ or greater to produce a polyalkali metal carbohydrate; and thereafter reacting the polyalkali metal carbohydrate derivative with a salt dissociatable at a temperature of approximately 78° C. to 115° C. in a nonaqueous system and selected from the group consisting of ethereal salts, non-metal salts and metal salts other than salts of alkali metals and ammonia at a temperature in the range of 78° C. to 118° C. whereby the salt cations replace the alkali metal cations to produce by double decomposition a polysubstituted carbohydrate derivative.

20. A dimetallic starchate in which the metal is uniformly substituted on the number 2 and number 3 carbon atoms.

21. A disodium starchate in which the metal is uniformly substituted on the number 2 and number 3 carbon atoms.

22. A glucopyranose polymer consisting of interlinked polymerized substantially uniformly substituted glucopyranose units each unit having the following structural formula in which each G represents an identical alkali metal cation.

23. A glucopyranose polymer consisting of interlinked polymerized substantially uniformly substituted glucopyranose units each unit having the following structural formula in which each G represents an identical ethereal salt cation.

24. A glucopyranose polymer consisting of interlinked polymerized substantially uniformly substituted glucopyranose units each unit having the following structural formula in which each G represents an identical cation of a metal salt other than alkali metal salts and ammonium salts.

25. A process of forming a polysubstituted glucopyranose polymer which consists of the steps of reacting the glucopyranose polymer with an 0.04 N or higher solution of alkali metal hydroxide having an ionization constant of $2 \times 10^{-5}$ in a nonaqueous alcoholic solvent in which there is enough of the alkali to permit two moles of alkali to react with each mole unit of carbohydrate, at a temperature of 115° C. or higher; so that water formed by the reaction is removed; and mixing the product with a solution of an alkali metal in liquid ammonia.

26. A process of forming a polysubstituted glucopyranose polymer in which the substituents are uniformly substituted on the 2, 3 and 6 carbon atoms of each of the units making up the glucopyranose polymer which consists of the steps of reacting glucopyranose polymer by mixing it with alkali metal hydroxide at a temperature of 115° C. or higher in a substantially nonaqueous alcoholic system, the alkali reactant being supplied in sufficient quantities to contain at least an 0.04 N solution with an ionization constant of $2 \times 10^{-5}$ and to permit two moles of alkali to react with each mole unit of glucopyranose polymer to produce a 2,3-polyalkali glucopyranose polymer and removing water formed by the reaction; reacting the glucopyranose polymer so formed with an alkyl halide to produce a polyether glucopyranose polymer by double decomposition; and mixing the product with a solution of alkali metal and liquid ammonia to produce a 2,3-alkyl,6-alkali glucopyranose polymer.

27. A process of forming a 2,3-polysubstituted glucopyranose polymer which comprises the steps of first reacting glucopyranose polymer to replace the hydroxyl hydrogen of the No. 2 carbon by an alkali metal by mixing the glucopyranose polymer in an 0.04 N or higher solution of an alkali metal hydroxide having an ionization constant of $2 \times 10^{-5}$ in a nonaqueous alcoholic system in which there is enough of the alkali to permit a mole of the alkali to react with each mole unit of the glucopyranose polymer at a temperature of 80° C. to 115° C. to produce a 2-monoalkali glucopyranose polymer and thereafter mixing the 2-monoalkali glucopyranose polymer so formed with an 0.04 N or higher solution of alkali metal hydroxide having an ionization constant of $2 \times 10^{-5}$ in a nonaqueous alcoholic system in which there is enough of the alkali to permit a mole of alkali to react with each mole unit of glucopyranose polymer at a temperature of 115° C. or higher.

28. A glucopyranose polymer consisting of interlinked and polymerized substantially uniformly substituted glucopyranose units each having the structural formula of in which each G represents an identical ethereal salt cation and in which each G' is an identical cation of a metal salt other than alkali metals and ammonia.

KENNETH M. GAVER.
ESTHER P. LASURE.
DERK V. TIESZEN.

REFERENCES CITED

The following references are of record in the file of this patent:

UNITED STATES PATENTS

| Number | Name | Date |
| --- | --- | --- |
| 2,258,168 | White | Oct. 7, 1941 |
| 2,294,924 | Miller et al. | Sept. 8, 1942 |
| 2,294,925 | Miller et al. | Sept. 8, 1942 |
| 2,397,732 | Gaver | Apr. 2, 1946 |
| 2,518,135 | Gaver | Aug. 8, 1950 |

OTHER REFERENCES

Schmid et al., Ber. V. 58 (1925) 1966, 1 page.